United States Patent
Tamai et al.

(10) Patent No.: US 6,914,385 B2
(45) Date of Patent: Jul. 5, 2005

(54) LOAD DRIVE FOR DRIVING LAMPS IN VEHICLES

(75) Inventors: Yasuhiro Tamai, Shizuoka (JP); Tetsuya Hasegawa, Shizuoka (JP)

(73) Assignee: Yazaki Corporation, Tokyo (JP)

( * ) Notice: Subject to any disclaimer, the term of this patent is extended or adjusted under 35 U.S.C. 154(b) by 0 days.

(21) Appl. No.: 10/330,299

(22) Filed: Dec. 30, 2002

(65) Prior Publication Data

US 2003/0151369 A1 Aug. 14, 2003

(30) Foreign Application Priority Data

Feb. 14, 2002 (JP) ..................................... P2002-036904

(51) Int. Cl.[7] ................................................ B60Q 1/26
(52) U.S. Cl. ......................... 315/77; 315/246; 307/10.8
(58) Field of Search ........................... 315/77, 82, 246, 315/291, 76, 299, 301, 307; 307/10.1, 10.8; 320/139–141

(56) References Cited

U.S. PATENT DOCUMENTS

| | | | | | |
|---|---|---|---|---|---|
| 4,992,672 | A | * | 2/1991 | Norton | 307/10.1 |
| 5,021,727 | A | * | 6/1991 | Mashino | 322/7 |
| 5,334,926 | A | * | 8/1994 | Imaizumi | 320/104 |
| 6,351,074 | B1 | * | 2/2002 | Ito et al. | 315/82 |
| 6,384,489 | B1 | * | 5/2002 | Bluemel et al. | 307/10.1 |
| 6,437,519 | B1 | * | 8/2002 | Ito | 315/291 |
| 6,455,951 | B1 | * | 9/2002 | Shultz et al. | 307/10.1 |
| 6,489,730 | B2 | * | 12/2002 | Ito et al. | 315/219 |
| 6,548,916 | B1 | * | 4/2003 | Kanazawa et al. | 307/85 |
| 6,583,570 | B1 | * | 6/2003 | Ito et al. | 315/82 |
| 2001/0019224 | A1 | * | 9/2001 | Amano et al. | 307/10.7 |

FOREIGN PATENT DOCUMENTS

DE        100 42 903 A1        5/2001

OTHER PUBLICATIONS

"Entwicklung Kungftiger Bordnetz–Architekturen auf der Bsais der Spezifikation des Zweispannungsbordnetzes 42V/14V; Future System Architectures Based on the Dual Voltage Electrical Power System specification 42V/14V;" Dr.–Ing F. Schmidt, Dr.–Ing R. Blumel, Ing W.–D Blauensteiner, Stuttgart, VDI–Verlag 8., Sep. 10, 1998 Tagung "Elektronik im Kraftfahrzedg" Baden–Baden.

* cited by examiner

*Primary Examiner*—Thuy Vinh Tran
(74) *Attorney, Agent, or Firm*—Sughrue Mion, PLLC

(57) ABSTRACT

A load drive (1) having a pulse converter (2) and a DC/DC converter (5). The pulse converter (2) is capable of converting a high DC voltage supplied from the power supply unit (10) of a vehicle to a pulse voltage and applies the pulse voltage to a first lamp (L1). The DC/DC converter (5) operates to convert the high DC voltage to a low DC voltage whose voltage value is lower than the voltage value of the high DC voltage and applies the low DC voltage to a second lamp (L2).

3 Claims, 1 Drawing Sheet

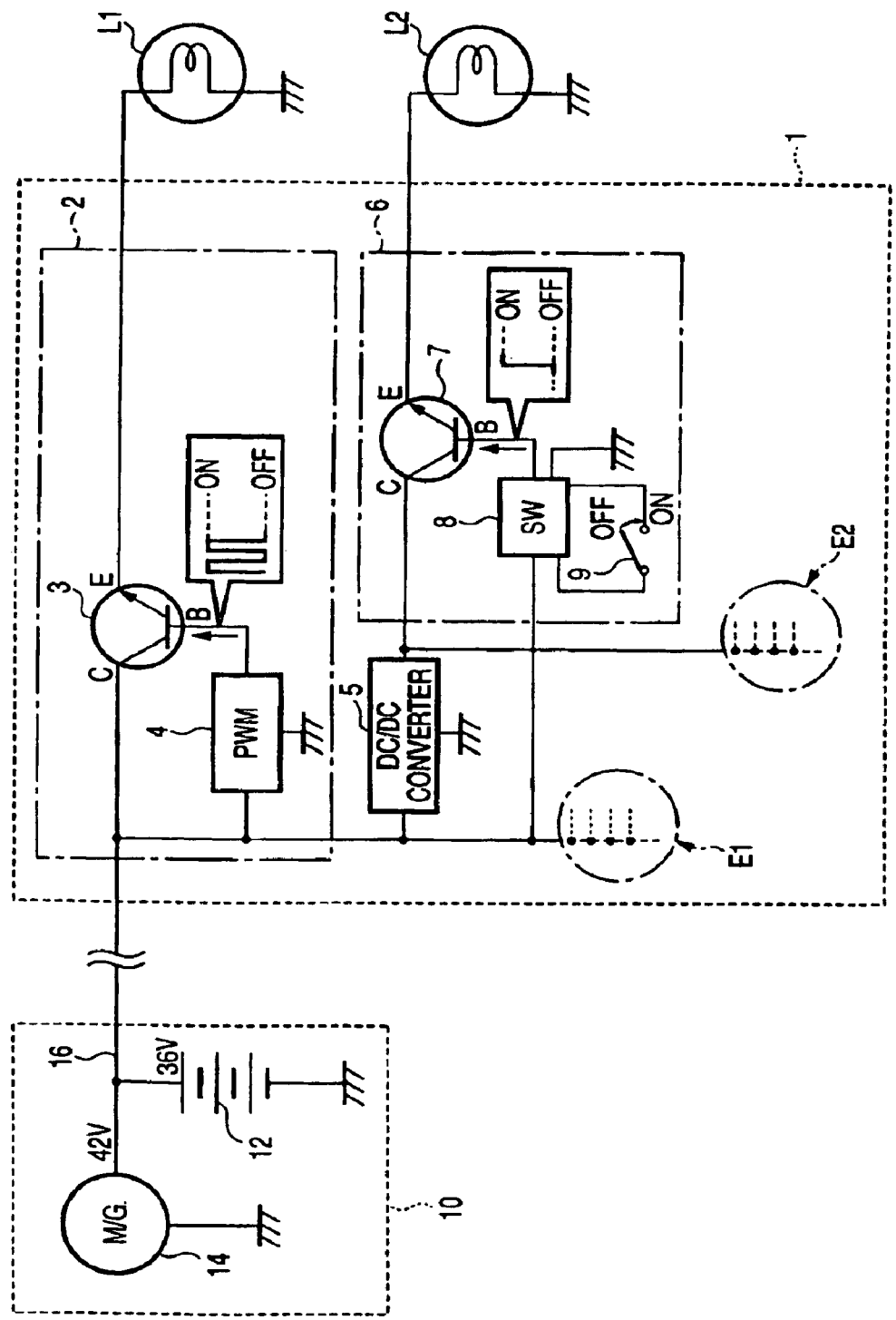

LOAD DRIVE FOR DRIVING LAMPS IN VEHICLES

BACKGROUND OF THE INVENTION

The present invention relates to a load drive which can be loaded into various vehicles including automobiles and more particularly to a load drive for driving various lamps in a vehicle loaded with a high-tension power supply unit under development in recent years.

There is a generally known automobile (i.e., so-called 14V vehicle) loaded with a power supply unit whose rated DC output ranges from 12V to 14V and which has an alternator of 14 volts (hereinafter called the 'volt' or 'V') and a 12V battery capable of charge and discharge. In the 14V vehicle, the load drive that is supplied with electric power from the power supply unit so as to drive various lamps such as a headlamp, a room lamp and the like generally operates to light each of the lamps by directly supplying an electric power of 12V–14V.

Recently, the development of a high-tension economical automobile (i.e., so-called 42V vehicle) is proceeding, the high-tension automobile being loaded with a power supply unit whose rated DC output ranges from 36V to 42V with a 42V motor/generator and a 36V battery capable of charge and discharge. With respect to the 42V vehicle, in a load drive under review for driving various lamps for use in the 14V vehicle, the collector terminal and the emitter terminal of an NPN switching power transistor, for example, are connected in series to a power supply line of DC 36V–42V connected to each lamp, and a rectangular-wave pulse voltage, for example, is applied to the base terminal of the switching power transistor so as to keep the electric power supplied from the emitter terminal of the switching power transistor to the lamp under PWM (i.e., Pulse Width Modulation) control.

However, for the various lamps, there are lamps directly replaceable by a vehicle user such as those for illuminating inside the vehicle including a room lamp, a map lamp, a foot lamp and so forth.

In the 42V vehicle provided with the load drive, tests were made for replacing the lamp for illuminating inside the vehicle while a power supply switch of the lamp therefor was held ON. Then confirmation was held up of a lamp damage phenomenon in which the filaments of new lamps were fused immediately after the lamps were installed due to pulse voltage including DC current component from 36V to 42V at the emitter terminal of the switching power transistor and as well as large current caused by the pulse voltage. The lamp damage phenomenon should be understood to mean that glass bulbs of lamps for illuminating inside vehicles may be broken because of filament fusion and that the load drive poses a serious problem to be solved.

SUMMARY OF THE INVENTION

An object of the invention made in view of the forgoing problems is to provide a load drive for properly driving various lamps in a vehicle loaded with a high-tension power supply unit and making it possible to mount lamps for illuminating inside the vehicle with safety.

In order to solve the aforesaid object, the invention is characterized by having the following arrangement.

(1) A load drive for supplying electric power from a power supply unit of a vehicle to first and second lamps comprising:

a pulse converter for converting a high DC voltage supplied from the power supply unit to pulse voltage and supplying the pulse voltage to the first lamp; and a DC voltage converter for converting the high DC voltage to a low DC voltage lower than the high DC voltage and supplying the low DC voltage to the second lamp.

(2) The load drive according to (1), wherein rated output voltage of the power supply unit used to output the high DC voltage is 36V or higher than 36V and the low DC voltage is 28V or lower than 28V.

(3) The load drive according to (1), wherein the second lamp is a lamp for illuminating inside the vehicle.

In The present disclosure relates to the subject matter contained in Japanese patent application No. 2002-036904 (filed on Feb. 14, 2002), which is expressly incorporated herein by reference in their entireties.

BRIEF DESCRIPTION OF THE DRAWINGS

The FIGURE is a block circuit diagram showing a load drive arrangement.

DETAILED DESCRIPTION OF PREFERRED EMBODIMENTS

A detailed description will now be given of a preferred embodiment of the invention with reference to the drawings. The FIGURE is a block circuit diagram showing a load drive arrangement according to the invention and particularly referring to a case where the invention is applied to a high-tension automobile (i.e., so-called 42V vehicle) which is under development now by way of example.

As shown in the FIGURE, the power supply unit of a 42V vehicle includes a 36V battery 12 capable of charge and discharge and a motor generator 14, the rated output voltage value of the power supply unit 10 ranging from DC 36V to 42V. The motor generator 14 has both a motor function working as part of the power of the vehicle on receiving electric power from the battery 12 and a generator function for generating an electric power of 42V by the revolution of an engine (not shown). A load drive 1 is electrically connected to the power supply unit 10 by a high-tension power line 16 and supplied with high-tension DC power at 36V–42V from the power supply unit 10 via the high-tension power line 16. Although the high-tension power line 16 is normally led from the power supply unit 10 via at least J/B (i.e., Junction Block) to various load drives, the illustration of the J/B concerned has been omitted in FIG. 1.

The load drive 1 is provided with a pulse converter 2 capable of converting the high DC voltage supplied from the power supply unit 10 to a pulse voltage. The pulse converter 2 has a switching power transistor 3 and a pulse width modulator 4. According to this embodiment of the invention, an NPN bipolar transistor is employed as an example of the switching power transistor 3 as shown in the FIGURE; however, a PNP bipolar transistor, a MOS transistor or the like may be used instead as the occasion demands.

The collector terminal and the emitter terminal of the switching power transistor 3 are connected to the high-tension power line 16 in series. The emitter terminal of the switching power transistor 3 is electrically connected to a first lamp L1 and the base terminal thereof is electrically connected to the pulse width modulator 4. The pulse width modulator 4 varies the pulse duty factor of the pulse voltage applied to the base terminal of the switching power transistor 3 so as to perform PWM (i.e., Pulse Width Modulation) control on the voltage applied from the emitter terminal of the switching power transistor 3 to the first lamp L1 (i.e., the electric power supplied to the first lamp L1).

More specifically, when a rectangular, triangle or saw tooth pulse voltage or DC voltage, for example, is applied from the pulse width modulator 4 to the base terminal of the switching power transistor 3, the switching power transistor 3 is turned on and electric power is supplied from the emitter terminal to the first lamp L1, so that the first lamp L1 is lighted up. When the pulse voltage is applied from the pulse width modulator 4 to the base terminal of the switching power transistor 3, a pulse voltage containing a voltage component of approximately 36V–42V in a no-load condition is generated at the emitter terminal of the switching power transistor 3. In comparison with a case where the DC voltage is applied from the pulse width modulator 4 to the base terminal of the switching power transistor 3, the quantity of electric power supplied to the first lamp L1 lowers in the case of the pulse voltage, which results in lowering the brightness of the first lamp L1. The pulse width modulator 4 is controlled by a control circuit (not shown) in accordance with the specification of the first lamp L1.

The load drive 1 is provided with a DC/DC converter (DC-DC converter) 5 as a DC voltage converter for converting the high DC voltage supplied from the power supply unit 10 to a low DC voltage of at least 28V. The DC/DC converter 5 is electrically connected to a second lamp L2 and used for supplying the low DC voltage to the second lamp L2.

In case where the low DC voltage is set at 28V, for example, an all-purpose lamp for use in the so-called 28V vehicle such as a bus or truck may be employed as the second lamp L2. In case where the low DC voltage is set at 14V, for example, an all-purpose lamp for use in a 14V vehicle may be employed as the second lamp L2. Therefore, in comparison with a case where a custom lamp for the 42V vehicle is employed, any less expensive general-purpose lamp may be employed as the second lamp L2. Needless to say, the low DC voltage may be set at lower voltage such as 5V.

As examples of the DC/DC converter 5, there are a known switching regulator constituted by semiconductor elements, electromagnetic converter elements, output voltage smoothing elements or the like, a known series regulator constituted by semiconductor elements, and the like. Although the efficiency of the switching regulator is generally greater than that of the series regulator, the former is more expensive than the latter and for this reason, the DC/DC converter 5 should be chosen in consideration of the voltage conversion ratio and the power consumption of the second lamp L2.

A switch circuit 6 for switching the second lamp L2 on and off is provided between the DC/DC converter 5 and the second lamp L2. The switch circuit 6 has a power transistor 7, a switch 8 and a mechanical switch 9. Although an NPN bipolar transistor has been employed as an example of the power transistor 7 according to this embodiment of the invention as shown in FIG. 1, a PNP bipolar transistor, a MOS transistor or the like may be used instead as the occasion demands. The collector terminal and the emitter terminal of the power transistor 7 are serially connected to a power supply line for electrically connecting the DC/DC converter 5 and the second lamp L2, whereas the base terminal of the power transistor 7 is connected to the switch 8. The mechanical switch 9 is connected to the switch 8. When the mechanical switch 9 is turned on or off, the switch 8 causes the ON (Hi) or OFF (Lo) voltage to be applied to the base terminal of the power transistor 7, whereby the second lamp L2 is switched on or off.

In this case, it is not necessarily needed to provide the switch circuit 6 between the DC/DC converter 5 and the second lamp L2 but to provide a control circuit (not shown) instead so as to perform the control of the DC/DC converter 5, the input control of the DC/DC converter 5 and the like. With this arrangement, a function equivalent to that of the switch circuit 6 can satisfactorily be carried out. Moreover, the switch circuit 6 may have only the mechanical switch 9, for example.

In order to facilitate the understanding of the load drive 1 according to the invention, the FIGURE has been simplified by showing only the circuits for driving the first lamp L1 and the second lamp L2. A portion indicated by a mark E1 signifies that the load drive 1 is equipped with circuits for properly driving a plurality of lamps such as the first lamp L1 and the second lamp L2.

A lamp to be treated as the first lamp L1 or the second lamp L2 should be selected so that the lamp is properly driven by the load drive 1. Particularly as shown by the test results described above, the lamp that may be damaged when it is mounted as the first lamp L1 while the switching power transistor 3 is held ON should be treated as the second lamp L2 to which electric power is supplied by supplying the low DC voltage thereto from the DC/DC converter 5. On the other hand, a lamp which does not meet the requirements for the second lamp L2 can be treated as the first lamp L1.

Thus, unlike the first lamp L1 to which the pulse voltage converted from the high DC voltage is applied from the pulse converter 2, the second lamp L2 can be mounted safely without being damaged even while the DC/DC converter 5 is outputting the low DC voltage because the low DC voltage converted by the DC/DC converter 5 from the high DC voltage is applied to the second lamp L2.

It is advantageous and preferable in view of cost to treat a lamp that does not fall under the category of the second lamp L2 as the first lamp L1 driven by the pulse converter 2 that is less expensive than the DC/DC converter 5. Particularly, a lamp that does not fall under the category of the second lamp L2 but requires great electric power should positively treated as the first lamp L1. It is therefore advantageous in view of cost to employ a lamp whose power consumption is great such as a headlamp which is a lamp for illuminating outside a vehicle, for example, as the first lamp L1 supplied with electric power from the pulse converter 2.

Provision of a DC voltage converter such as the DC/DC converter 5 for all lamps of the 42V vehicle is not favorable because the provision thereof tends to increase not only the cost but also the weight of the vehicle. Even if one DC voltage converter capable of supplying electric power to the whole lamp of the 42V vehicle is provided, the electric energy required to drive the whole lamp becomes enormously great and such a DC voltage converter capable of supplying an enormous quantity of electric power is extremely expensive and poses problems arising from size, weight, heat generation and so on, which is still disadvantageous. In other words, the greater the quantity of allowable output electric power, the greater the necessity of installing an expensive DC voltage converter arises.

In case where a lamp for illuminating inside the vehicle including a room lamp, a map lamp and a foot lamp giving power consumption lower than the lamp for illuminating outside the vehicle is employed as the second lamp L2, an inexpensive DC voltage converter having a smaller quantity of allowable output electric power can be employed. Further, safety is ensured by directly supplying the low DC voltage from the DC voltage converter to a user-replaceable lamp for illuniiAating inside the vehicle. As shown by a mark E2 in the FIGURE, the output power of the DC/DC converter 5 may be supplied to each of the several lamps for illuminating inside the vehicle. In this case, the switch circuit 6 may be provided between the DC/DC converter 5 and each of the lamps for illuminating inside the vehicle. Moreover, the load drive according to the invention is needless to say effective for any vehicle loaded with a power supply unit with its rated output voltage value at as low as at least DC 36V.

While the preferred form of the invention has been described by way of example, it is to be understood that the scope of the invention is not limited to the specific embodiments thereof and that various changes and modifications in the shape, form, quantity and arrangement of parts may be resorted to without departing from the spirit thereof.

As set forth above, the load drive according to the invention is such that, unlike the first lamp to which the pulse voltage converted from the high DC voltage is applied from the pulse converter, the second lamp can be mounted safely without being damaged even while the DC voltage converter is outputting the low DC voltage since the low DC voltage converted by the DC voltage converter from the high DC voltage is applied to the second lamp.

Further, the load drive according to the invention is such that in case where the load drive according to the invention is loaded into the 42V vehicle loaded with the power supply unit whose rated output voltage value is 36V at the lowest, a lamp equivalent to the second lamp is effectively prevented from being damaged. Moreover, the low DC voltage value is 28V at the highest. In case where the low DC voltage is set at 28V, for example, an all-purpose lamp for use in the so-called 28V vehicle such as a bus or truck may be employed as the second lamp. In case where the low DC voltage is set at 14V, for example, an all-purpose lamp for use in the 14V vehicle may be employed as the second lamp. Therefore, in comparison with a case where a custom lamp for the 42V vehicle is employed, any less expensive all-purpose lamp may be employed as the second lamp.

The load drive according to the invention is such that the use of the lamp for illuminating inside the vehicle with power consumption lower than that of the headlamp as the lamp for illuminating outside the vehicle as the second lamp, for example, permits the inexpensive DC voltage converter with a quantity of allowable output electric power to be used. Further, safety is ensured by directly supplying the low DC voltage from the DC voltage converter to a user-replaceable lamp for illuminating inside the vehicle.

What is claimed is:

1. A load drive for supplying electric power from a power supply unit of a vehicle to first and second lamps comprising:
   a pulse converter for converting a high DC voltage supplied from the power supply unit to pulse voltage and supplying the pulse voltage to the first lamp; and
   a DC voltage converter for converting the high DC voltage to a low DC voltage lower than the high DC voltage and supplying the low DC voltage to the second lamp;
   wherein said power supply unit includes a motor generator and a single battery.

2. The load drive according to claim 1, wherein rated output voltage of the power supply unit used to output the high DC voltage is 36V or higher than 36V and the low DC voltage is 28V or lower than 28V.

3. The load drive according to claim 1, wherein the second lamp is a lamp for illuminating inside the vehicle.

* * * * *